Feb. 3, 1925.

J. A. DICKERMAN

FLEXIBLE SHAFT CONNECTION

Filed Oct. 17, 1922

1,525,026

INVENTOR.
John A. Dickerman
BY
Chamberlain + Newman
ATTORNEYS.

Patented Feb. 3, 1925.

1,525,026

UNITED STATES PATENT OFFICE.

JOHN A. DICKERMAN, OF BRIDGEPORT, CONNECTICUT, ASSIGNOR TO THE DAWN MFG. CO., OF STRATFORD, CONNECTICUT, A CORPORATION OF CONNECTICUT.

FLEXIBLE SHAFT CONNECTION.

Application filed October 17, 1922. Serial No. 595,034.

*To all whom it may concern:*

Be it known that JOHN A. DICKERMAN, a citizen of the United States, and resident of Bridgeport, in the county of Fairfield and State of Connecticut, has invented certain new and useful Improvements in Flexible Shaft Connections, of which the following is a specification.

This invention relates to improvements in flexible connections for rotatable shafts, and particularly to means adapted to compensate for variations of departures from parallel or angular misalignment of such shafts or a combination of both due to conditions incident to the setting-up and operation of the machines connected with such shafts.

The purpose of the invention is to provide a simple inexpensive and yet efficient form of flexible driving connection for shafts of the above sort which are particularly desirable for connecting shafts of comparatively small diameters, and by means of which such shafts may be quickly connected and disconnected without the use of additional parts such as lock pins, set screw, collars and the like.

The coupling is especially desirable for direct connection from motor driving shaft to a driven shaft, since the motor shaft is relieved of any end thrust.

The device further includes the formation of transverse slots or openings in the abutting end of two shafts and in the positioning of a suitable wire link in said openings, in a way to mechanically and operatively connect the two shafts so that the same may be operatively driven one from the other.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification and upon which—

Figure 1:
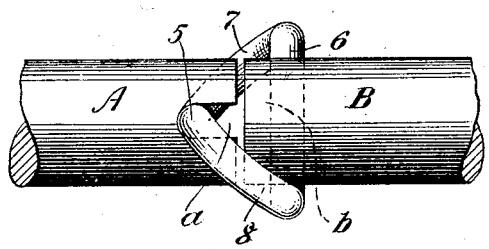
Fig. 1 shows a side view of the abutting end portions of a pair of shafts operatively connected by means of my flexible shaft connection.
Figure 2:
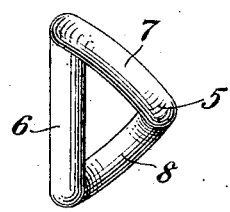
Fig. 2 is a side view of the connecting-link detached and as seen from the left side of Fig. 3.
Figure 3:
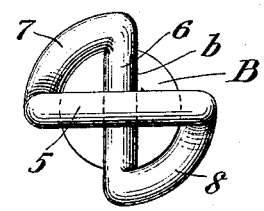
Fig. 3 is an end view of the shaft shown at the right in Fig. 1, with connecting-link positioned therein.
Figure 4:
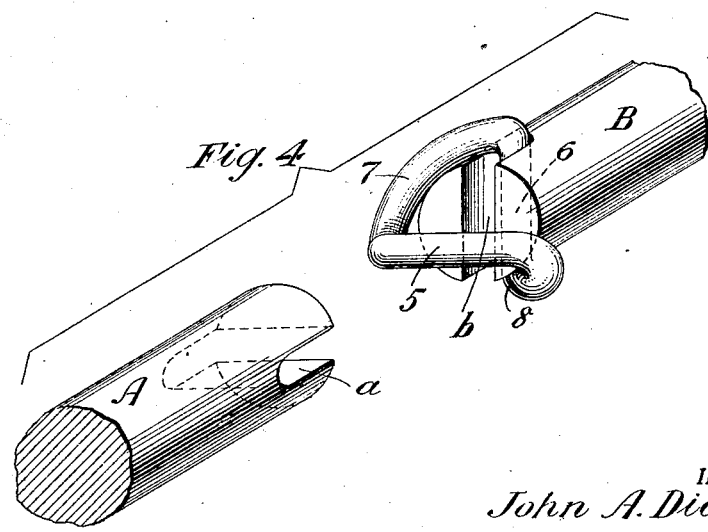
Fig. 4 shows an end perspective view of the same shaft and link and the other shaft disconnectedly positioned adjacent thereto.

Referring in detail to the characters of reference marked upon the drawings, A and B represent the adjacent end portions of two aligned shafts, positioned so as to be operated one by the other, thus forming a driving and driven member. Each of these shafts are provided with a transverse opening, one designated as $a$ and the other as $b$, said openings preferably being in the form of straight transverse slots cut in the ends of said shafts and through the center of the axes thereof.

For the purpose of receiving and supporting my improved form of link-connection I arranged these shafts so the openings $a$ and $b$ will be out of alignment and at right angles one to the other, better to accommodate the special form of twisted link which I employ therebetween to produce the universal connection desired. The link is formed of round wire or bar metal and may be made in any preferred manner to form a closed link.

In detail the link comprises two straight spaced apart side portions 5 and 6 arranged at right angles one to the other and positioned sufficiently distant one from the other to be properly seated in the transverse openings $a$ and $b$ respectively, before referred to. These straight side portions are integrally connected by the loop or bent end portions 7 and 8 which are so deflected as to encircle and engage the opposite peripheral portions of the shaft ends so as to support the link in its openings and insure the right angle positions of the respective slots or openings in the ends of the shafts.

The link as thus described is what might be called a twisted link having straight opposite side portions and rounded loops. From the foregoing it will be seen that a simple, attractive and durable link connection is formed which will drive equally as well in either direction, may be readily inserted or removed and inexpensively replaced should it become worn or broken.

Having thus described my invention, what I claim and desire to secure by Letters Patent is—

1. In a flexible connection of the class described, the combination with two rotatable shafts each having a transverse open-ended slot through its end portion, of a single wire link having straight end portions pivotally positioned in the said slots and operatively connecting the two end portions of the shafts and adapted to be disengaged by longitudinal movement of the shaft.

2. In a flexible connection of the class described, the combination with two aligned rotatable shafts, each provided with a transverse slot in its end portion, of a wire link opposite tranverse portions of which are straight and in engagement with the slots in the shafts in a way to drive the same, said shaft adapted to have pivotal movement about said transverse straight portions of the link, said link adapted to be disengaged by longitudinal movement of the shaft.

3. In a flexible connection of the class described, the combination with two aligned rotatable shafts, one of which is provided with a transverse slot in its end portion, of a single wire link, a portion of which is in engagement with the said slot and engaging the other shaft in a way to drive the same, and having another portion extending circumferentially about the periphery of one of said shafts to hold the link in position.

4. In a flexible connection of the class described, the combination with two rotatable shafts each having a transverse open-ended slot, of a single twisted link positioned in said slots and operatively connecting the two end portions of the shafts, said link adapted to be disengaged by longitudinal movement of said shafts.

5. In a flexible connection of the class described, the combination with two aligned rotatable shafts having transverse open-ended slots in their adjacent ends, of a twisted wire link having two spaced apart relatively straight side portions disposed at right angles to each other and adapted to engage the respective slots transversely of the shafts, whereby said shafts have pivotal movement about said straight side portions, and said link may be disengaged by longitudinal movement of said shafts and end portions connecting said side portions at their ends.

6. In a flexible connection of the class described, the combination with two aligned rotatable shafts having transverse openings in their adjacent ends, of a twisted wire link having two spaced apart relatively straight side portions engaged by the said openings and further including intermediate bent end portions to engage the sides of the shafts.

Signed at Bridgeport in the county of Fairfield and State of Connecticut this 14th day of October, A. D., 1922.

JOHN A. DICKERMAN.

Witnesses:
C. M. NEWMAN,
LILLIAN M. ALLING.